Jan. 9, 1945. H. T. KRAFT 2,366,860

RUBBER ARTICULATED JOINT

Filed Aug. 20, 1943

INVENTOR
*Herman T. Kraft*
BY
*Evans + McCoy*
ATTORNEYS

Patented Jan. 9, 1945

2,366,860

UNITED STATES PATENT OFFICE 2,366,860

RUBBER ARTICULATED JOINT

Herman T. Kraft, Akron, Ohio, assignor to The General Tire & Rubber Company, Akron, Ohio, a corporation of Ohio Application August 20, 1943, Serial No. 499,345

5 Claims. (Cl. 287—85)

This invention relates to rubber articulated torsional joints of the type having a rubber member longitudinally compressed to cause radial expansion of the rubber against both the pintle and the eye of the joint, so that relative torsional movement between the pintle and the eye will be taken up by strain in the rubber rather than by slippage between the rubber and the different parts of the joint.

Rubber articulated joints utilizing a tubular rubber member which is longitudinally compressed to cause radial expansion of the rubber against the pintle and the eye of the joint have been proposed and widely used. Such joints will stand considerably higher radial stresses in the rubber than joints having the rubber in the initially unstressed condition. However, even though such rubber acts in general as a noncompressible fluid, it is apparent that because of resistance to flow, the pressure tending to expand the diameter of the rubber member in the central portion of the joint is considerably different from that in other portions of the joint. This is evidenced by the fact that failures in the joint almost invariably occur but a short distance inwardly from the ends of the eye member of the joint instead of in the central portion thereof, indicating that the central portion of the joint is not bearing the desired proportion of the load.

It is an object of the present invention to provide rubber articulated joints of the type having rubber under longitudinal compression and radially expanded against the pintle and the eye of the joint, which joints have the rubber member more uniformly compressed throughout the entire volume between the pintle and the eye of the joint.

It is another object of the present invention to provide rubber articulated torsional joints of the type having rubber under longitudinal compression, which joints have the rubber member thereof under relatively uniform stress between the pintle and the eye member of the joint.

In some of the rubber articulated joints having the rubber compressed longitudinally to expand it radially against the pintle and the eye in the joint, as heretofore proposed, difficulty is experienced in preventing slippage from occurring between one of the metallic joint members and the rubber member, especially when the joints are deflected to a comparatively high degree. It is, therefore, another object of the present invention to provide a rubber articulated joint of the type having rubber under longitudinal compression, which joint may be relatively easily assembled but will tend to strongly grip the pintle and the surface of the eye member of the joint.

Other objects will be apparent from the following description of the invention as illustrated in the accompanying drawing, in which.

Figure 1:
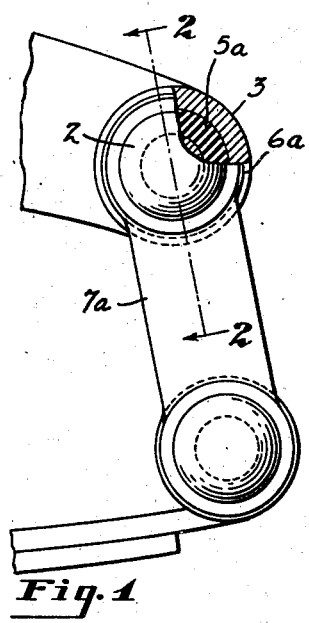
Figure 1 is a side elevational view of portions of a vehicle spring and frame having shackle members embodying joints of the present invention.
Figure 2:
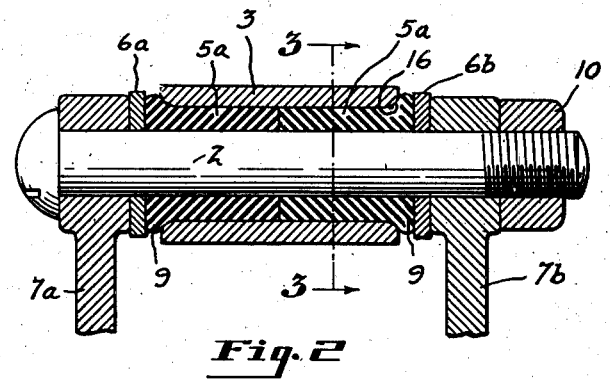
Fig. 2 is a partial sectional view on the line 2—2 of Fig. 1.

Referring more particularly to the drawing, in which like parts are designated by like numerals of reference throughout the several views, the joints comprise members, such as the pintle 2 and the eye member 3, which are subjected to relative torsional movement. The eye member 3 has an opening therethrough with substantially cylindrical walls. The pintle 2 is substantially coaxial with the opening in the eye member 3 and is separated therefrom by the generally cylindrical rubber bushing member which is preferably composed of two resilient, generally tubular bushings 5—a. The rubber members are under longitudinal compression between the end members 6—a and 6—b, carried by the pintle 2 and bearing against portions of the rubber members 5—a extending beyond each end of the eye member 3.

The eye member 3 may be attached to a supported or supporting member, such as the frame or spring of a vehicle. The connector members 7—a and 7—b, which are non-rotatively carried by the pintle 2 may be attached to the member having relative movement with the eye member 3.

Figure 6:
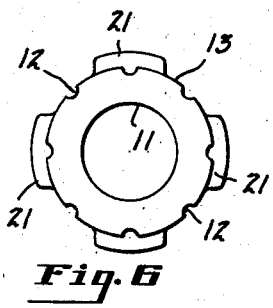
Fig. 6 is an end elevational view of a modified form of rubber member for joints embodying the present invention.
Figure 7:
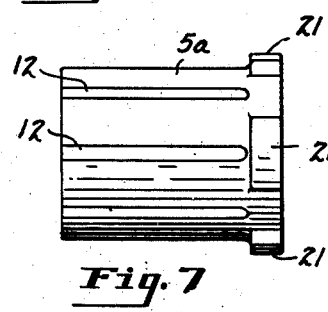
Fig. 7 is a side elevational view of the member illustrated in Fig. 6.
Figure 5:
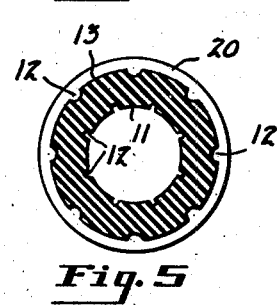
Fig. 5 is a cross sectional view on the line 5—5 of Fig. 4.
Figure 8:
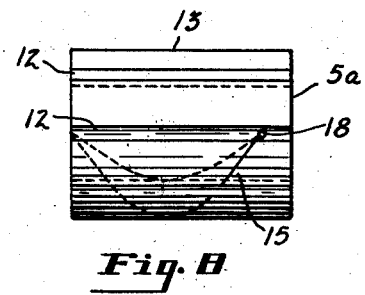
Fig. 8 is a side elevational view of still another modified form of resilient bushing for rubber articulated joints embodying the present invention.
Figure 9:
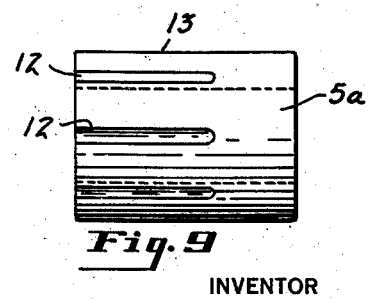
Fig. 9 is an elevational view of still another modified form of resilient bushing for joints embodying the present invention.

The rubber member 5 or each of the portions 5—a thereof has a cylindrical portion adapted to lie within the opening of the eye member and an aligning or centering portion 9 which extends beyond the end of the eye member 3. The portion 9 may carry aligning means such as the flange 20 (Fig. 5) or the lugs 21 (Figs. 6 and 7) to facilitate centering of the rubber member within the opening of the eye member. Desired longitudinal compression may be obtained by decrease in the distance between the connectors members 7—a and 7—b or the end members 6—a and 6—b by turning the nut 10 with respect to the threaded portion of the pintle 2.

In accordance with the present invention, the bushings 5—a of the rubber member 5 are provided with a plurality of spaced grooves 12, which preferably extend in a generally longitudinal direction over the outer and inner surfaces of the rubber member 5 so as to bear against the pintle or the eye of the joint. The grooves 12 preferably lie entirely within the eye member 3, i. e., they preferably terminate between the ends of the cylindrical opening of the eye member. They are provided in at least the central portion of the joint, i. e., the portion bearing against the central portion of the eye member and/or the pintle 2, to provide space for equalizing flow of the rubber compound or rubberlike material of the member 5 when strong pressure is applied between the ends thereof. The grooves thus permit greater equalization of the pressure interiorly of the eye member so that more uniform stresses are applied to the rubber member 5. A more desirable joint having a relatively high flexing life is thereby produced.

Figure 3:
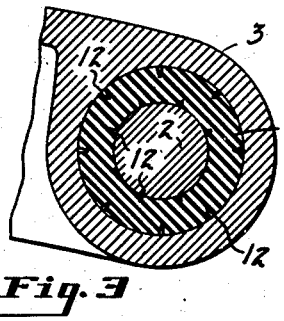
Fig. 3 is a sectional view on the line 3—3 of Fig. 2.
Figure 4:
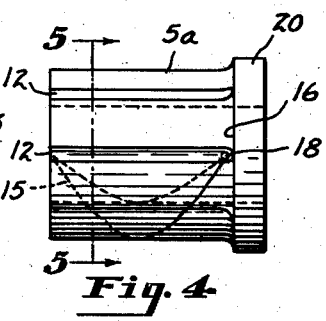
Fig. 4 is a side elevational view of one of the resilient rubber members in joints of the present invention.

The substantially longitudinal grooves 12 also function somewhat as do the configurations of an antiskid tire tread to provide increased friction between the joint members against which they bear. They tend to decrease slippage, with the result that less abrasion occurs when the joint is flexed relatively severely. The grooves 12 may be substantially completely filled, as illustrated in Fig. 3 when the rubber member is under the desired compression.

In order to further equalize pressure in the interior portion of the joint, a spiral slot or cut 15 is preferably provided in a portion of the rubber member 5 or the cylindrical portion of the bushings 5—a contained within the opening in the eye member 3. The slot or cut 15 preferably extends only to the edge 16 of the portion 9, which normally protrudes beyond the ends of the eye member 3. In order to prevent the cut 15 from extending through the portion 9, an enlarged opening 18 of larger diameter than the cut may be provided to prevent concentration of the stress and to thus give increased cracking resistance.

The edges of the slot or cut 15 may be spaced apart or may be lubricated by lubricant of a type, such as a wax-free petrolatum, which is readily absorbed into the rubber so that relative compensating movement between the edges may occur. The slope of the slot or cut 15 is also important as it is found that too little slope increases the frictional resistance between the edges of the cut and may prevent or decrease the tendency for equalization of pressure. Preferably, the slope of the cut 15 is about 30 degrees with axis of the pintle or 60 degrees with the ends of the bushing which lie in planes perpendicular to the axis of the pintle. When the slope is much greater than 40 or 45 degrees with the axis of the pintle, friction of most rubber stocks prevents the desired adjustment of the portions of the rubber. When the slope of the spiral is less than 15 or 20 degrees with the axis, there is a tendency for uniform expansion to decrease. The preferred slope of the spiral cut 15 should be varied in accordance with the coefficient of friction between the side edges of the cut and is less when the coefficient of friction is increased.

Torsional joints of the present invention have the rubber thereof under substantially uniform strain and, therefore, have excellent life in commercial use. Since the coefficient of friction against the pintle and the eye of the joint is substantially increased by the treadlike grooves 12, which preferably extend over portions of the inner surface 11 as well as the outer surface 13, tendency for slippage between the pintle and the inner surface 11 and between the outer surface 13 and the inner surface of the eye member is considerably reduced.

The term rubber is used herein generically to include natural and synthetic rubber compounds, reclaim, rubbery polymer and the like, all of which may be used in obtaining the results of the present invention.

It is to be understood that variations and modifications of the specific joints herein shown and described for purposes of illustration may be made without departing from the spirit of the invention.

What I claim is:

1. In a pivotal connection between members adapted to have relative torsional movement, which pivotal connection has an eye member with a substantially cylindrical opening therethrough, a pintle extending through and substantially coaxial with said cylindrical opening, a bushing of soft resilient rubberlike material separating said pintle from the cylindrical wall of said cylindrical opening and extending beyond one end of said cylindrical opening, and means for compressing the end of said rubberlike bushing to cause radial expansion of said bushing against the internal cylindrical wall of said opening and against the outer surface of said pintle, said bushing characterized by having a cylindrical portion to separate said pintle from said cylindrical wall of said opening, an aligning portion to normally protrude beyond an edge of said opening, and means providing for circumferential flow of the rubber comprising a series of spaced longitudinal grooves extending over a major part of said cylindrical portion but not extending over said aligning portion.

2. In a pivotal connection between members adapted to have relative torsional movement, which pivotal connection has an eye member with a substantially cylindrical opening therethrough, a pintle extending through and substantially coaxial with said cylindrical opening, a bushing of soft resilient rubberlike material separating said pintle from the cylindrical wall of said cylindrical opening and extending beyond one end of said cylindrical opening, and means for compressing the end of said rubberlike bushing to cause radial expansion of said bushing against the internal cylindrical wall of said opening and against the outer surface of said pintle, said bushing characterized by having a substantially cylindrical portion separating said cylindrical wall from said pintle and an aligning portion at one end thereof for centering said bushing with respect to said cylindrical opening, and means providing for circumferential flow of the rubber comprising a series of spaced longitudinal grooves extending over a major portion of the outer surface of said cylindrical portion.

3. In a pivotal connection between members adapted to have relative torsional movement, which pivotal connection has an eye member with a substantially cylindrical opening therethrough, a pintle extending through and substantially coaxial with said cylindrical opening, a bushing of soft resilient rubberlike material separating said pintle from the cylindrical wall of said cylindrical opening and extending beyond one end of said cylindrical opening, and means for compressing the end of said rubberlike bushing to cause radial expansion of said bushing against the internal cylindrical wall of said opening and against the outer surface of said pintle, said bushing having a substantially cylindrical portion separating said cylindrical wall from said pintle and an aligning portion at one end thereof for centering and aligning said bushing with respect to said cylindrical opening, and means providing for circumferential flow of the rubber comprising a series of spaced longitudinal grooves extending over the major portion of the inner surface thereof and adapted to bear against the outer surface of said pintle.

4. In a pivotal connection between members adapted to have relative torsional movement, which pivotal connection has an eye member with a substantially cylindrical opening therethrough, a pintle extending through and substantially coaxial with said cylindrical opening, a bushing of soft resilient rubberlike material separating said pintle from the cylindrical wall of said cylindrical opening and extending beyond one end of said cylindrical opening, and means for compressing the end of said rubberlike bushing to cause radial expansion of said bushing against the internal cylindrical wall of said opening and against the outer surface of said pintle, said bushing having a substantially cylindrical portion separating said cylindrical wall from said pintle and an aligning portion at one end thereof for centering and aligning said bushing with respect to said cylindrical opening, a plurality of longitudinally extending spaced grooves over the major portion of the inner surface thereof and adapted to bear against the outer surface of said pintle, and a spiral slit extending through the major portion of said cylindrical portion up to said aligning portion and permitting relative sliding movement between portions of said bushing, whereby initial expansion throughout the length of said cylindrical member is substantially uniform.

5. The joint of claim 4 wherein the slope of said spiral slit is between 15 degrees and 45 degrees with respect to the longitudinal axis of the bushing.

HERMAN T. KRAFT.